US012323442B2

(12) United States Patent
Earhart et al.

(10) Patent No.: US 12,323,442 B2
(45) Date of Patent: Jun. 3, 2025

(54) DETERMINING PHYSICAL REAL ESTATE UTILIZATION FROM NETWORK AND SECURITY DATA

(71) Applicant: MASTERCARD INTERNATIONAL INCORPORATED, Purchase, NY (US)

(72) Inventors: Steven Earhart, Kirkwood, MO (US); Leila Hassan, Ballwin, MO (US); James J. Arnott, Berthoud, CO (US); Adam Suarez, Raleigh, NC (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 542 days.

(21) Appl. No.: 17/564,746

(22) Filed: Dec. 29, 2021

(65) Prior Publication Data

US 2023/0208865 A1    Jun. 29, 2023

(51) Int. Cl.
*H04L 9/40* (2022.01)
(52) U.S. Cl.
CPC ...... *H04L 63/1425* (2013.01); *H04L 63/0272* (2013.01)
(58) Field of Classification Search
None
See application file for complete search history.

(56) References Cited

U.S. PATENT DOCUMENTS

| 10,181,139 B2 | 1/2019 | Glass et al. |
| 10,298,411 B2 | 5/2019 | Donlan et al. |
| 11,948,015 B2 * | 4/2024 | Shrivastava ............... G06F 9/54 |
| 2009/0193217 A1 * | 7/2009 | Korecki ............... G06Q 10/087 |
| | | 711/170 |
| 2013/0289952 A1 * | 10/2013 | Marwah ................. G06Q 50/06 |
| | | 703/2 |
| 2014/0032433 A1 | 1/2014 | Eick et al. |
| 2014/0278594 A1 | 9/2014 | Vivadelli et al. |
| 2015/0262132 A1 * | 9/2015 | Miller ........... G06Q 10/063114 |
| | | 705/7.15 |

(Continued)

FOREIGN PATENT DOCUMENTS

| CN | 110612541 A | 12/2019 |
| WO | 2008/060440 A2 | 5/2008 |

(Continued)

*Primary Examiner* — Atta Khan
(74) *Attorney, Agent, or Firm* — Talem IP Law, LLP (57) ABSTRACT

A method of determining physical real estate utilization can begin with receiving network and security data of an enterprise. A sign of work can be identified from the network and security data. For each sign of work, an Internet Protocol (IP) address and user identifier can be determined from the network and security data associated with the sign of work. Further, one or more user characteristics associated with the user identifier can be determined, and a physical location of the user at a time can be determined based on the IP address. The user characteristics and the physical location can be stored. Insights on physical real estate utilization can be generated based on at least two of: user characteristics of each user, the physical location of each user, and temporal data from the received network and security data, and a set of the insights can be output.

17 Claims, 6 Drawing Sheets

(56) References Cited

U.S. PATENT DOCUMENTS

| | | | |
|---|---|---|---|
| 2016/0173488 A1* | 6/2016 | Xie | .................... H04L 9/3263 |
| | | | 713/156 |
| 2019/0020556 A1 | 1/2019 | Pefkianakis et al. | |
| 2020/0074439 A1* | 3/2020 | Hayman | ............ G06Q 20/3224 |

FOREIGN PATENT DOCUMENTS

| | | |
|---|---|---|
| WO | 2018/210630 A1 | 11/2018 |
| WO | 2019/020799 A1 | 1/2019 |

* cited by examiner

DETERMINING PHYSICAL REAL ESTATE UTILIZATION FROM NETWORK AND SECURITY DATA

BACKGROUND

Identifying usage of business real estate environments is an important data point in decisions regarding resource investment needs, scheduling of shared workspaces, and even energy consumption (e.g., for controlling heating/air, lighting). By knowing the use of a workspace and amount of space needed, optimizations can be made, resulting in improved costs and improved employee productivity. With the rise of teleworking in the wake of a pandemic, there has been further interest in determining optimal business real estate utilization.

Occupancy data has been historically somewhat difficult to determine, especially as a result of modern trends such as desk-sharing or even elimination of personal areas altogether. Low-technology methods—like counting people—have issues with double-counting individuals and fail to account for individuals coming in for less than a full day and thus overcounting their space usage. Even methods that use more refined methods such as sensors can fail to account for different types of individuals (e.g., customers, visiting employees) that may have different needs than more traditional employees.

BRIEF SUMMARY

Network and security data can be leveraged as a sign of work to properly manage physical real estate usage. Network usage data of users, for example Internet Protocol (IP) addresses and associated user identifiers, can be collected over time and compared against a database of known IP addresses and user identifiers to attach other data, such as primary work location, department, and employment status. This data can be used to determine insights (e.g., office space utilization over time) to aid in properly managing resources.

A method of determining physical real estate utilization comprising can begin with receiving network and security data of an enterprise. Once the network and security data are received, a sign of work can be identified from the network and security data. For each identified sign of work, an Internet Protocol (IP) address and user identifier can be determined from the network and security data associated with the sign of work. Further, one or more user characteristics of a user associated with the user identifier can be determined, and a physical location of the user at a particular time can be determined based on the IP address. The one or more user characteristics of the user and the physical location of the user can be stored. Insights on physical real estate utilization can be generated based on at least two from the group consisting of: the one or more user characteristics of each user, the physical location of each user, and temporal data from the received network and security data of the enterprise, and a set of insights from the generated insights can be output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Network and security data can be leveraged as a sign of work to properly manage physical real estate usage. Network usage data of users, for example Internet Protocol (IP) addresses and associated user identifiers, can be collected over time and compared against a database of known IP addresses and user identifiers to attach other data, such as primary work location, department, and employment status. This data can be used to determine insights (e.g., office space utilization over time) to aid in properly managing resources.

Figure 1A:
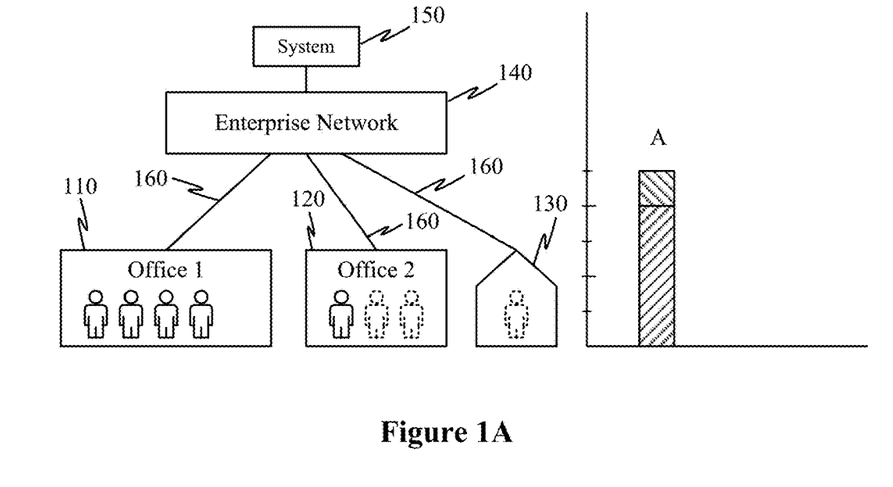
FIGS. 1A-1C illustrate a scenario for determining physical real estate utilization from network and security data.
Figure 1B:
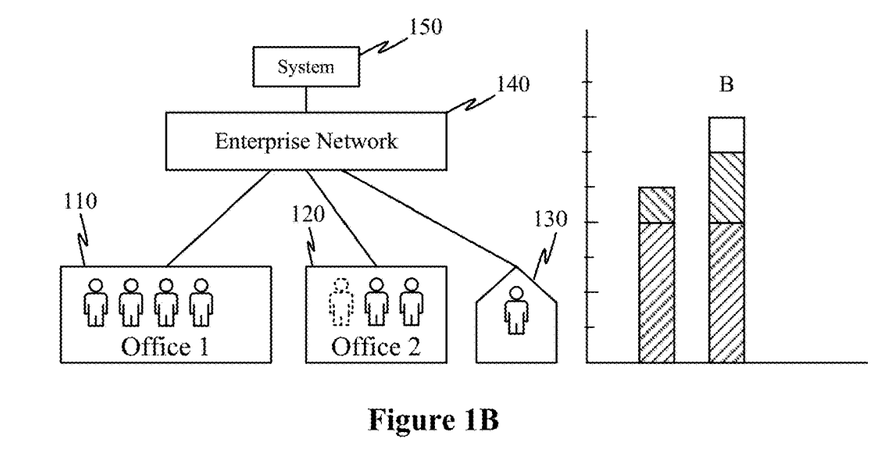
Figure 1C:
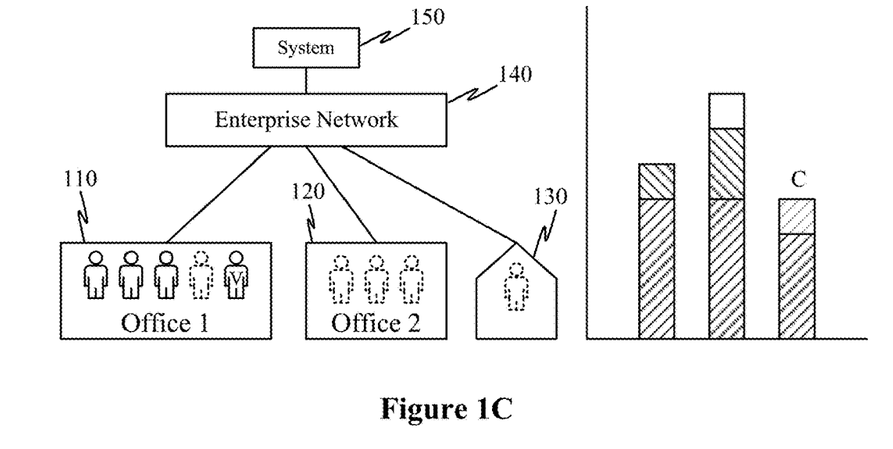
Figure 5:
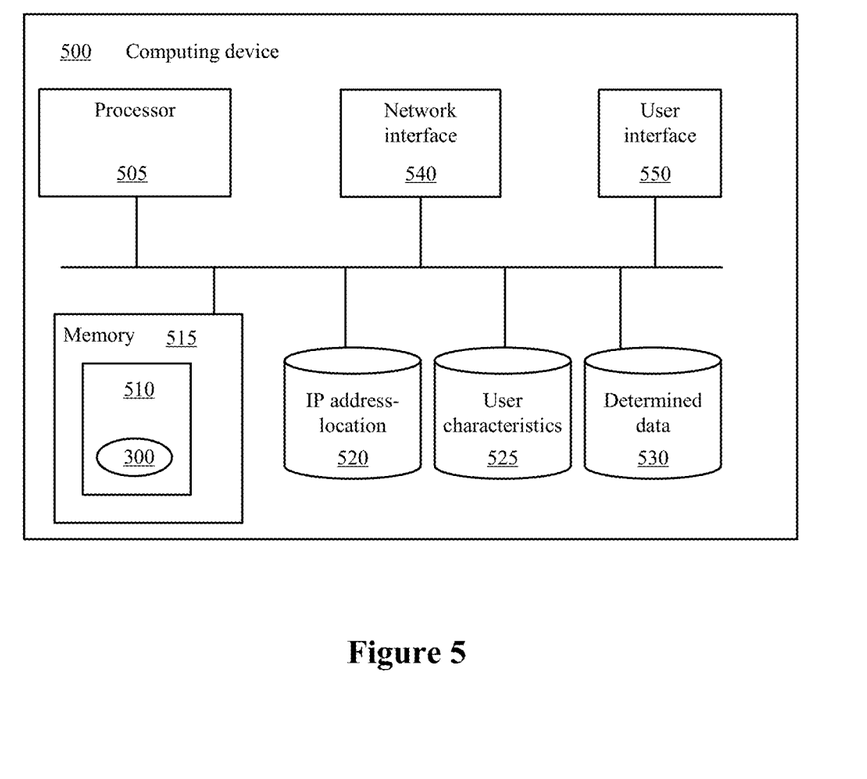
FIG. 5 shows a system for performing determination of physical real estate utilization.

FIGS. 1A-1C illustrate a scenario for determining physical real estate utilization from network and security data. An enterprise can have a number of different offices at different locations and can additionally permit employees to work remotely. In the illustrative scenario, two offices, First Office 110 and Second Office 120 are used by an enterprise, where some employees work at the First Office 110, some employees work at the Second Office 120, and the same or different employees can work at a remote office, for example at their home 130. In addition, certain employees or non-employees with access to the enterprise network may work as visitors of an office (e.g., for a meeting or due to other reasons). Employees (or non-employees with certain rights) access software, data, and certain hardware resources via an enterprise network 140. System 150, which may be embodied as shown in FIG. 5, can utilize network and security data 160 from the enterprise network 140 to perform processes for determining physical real estate utilization as described herein, enabling various insights to the physical real estate utilization, an example of which is shown in FIGS. 1A-1C.

Figure 2:
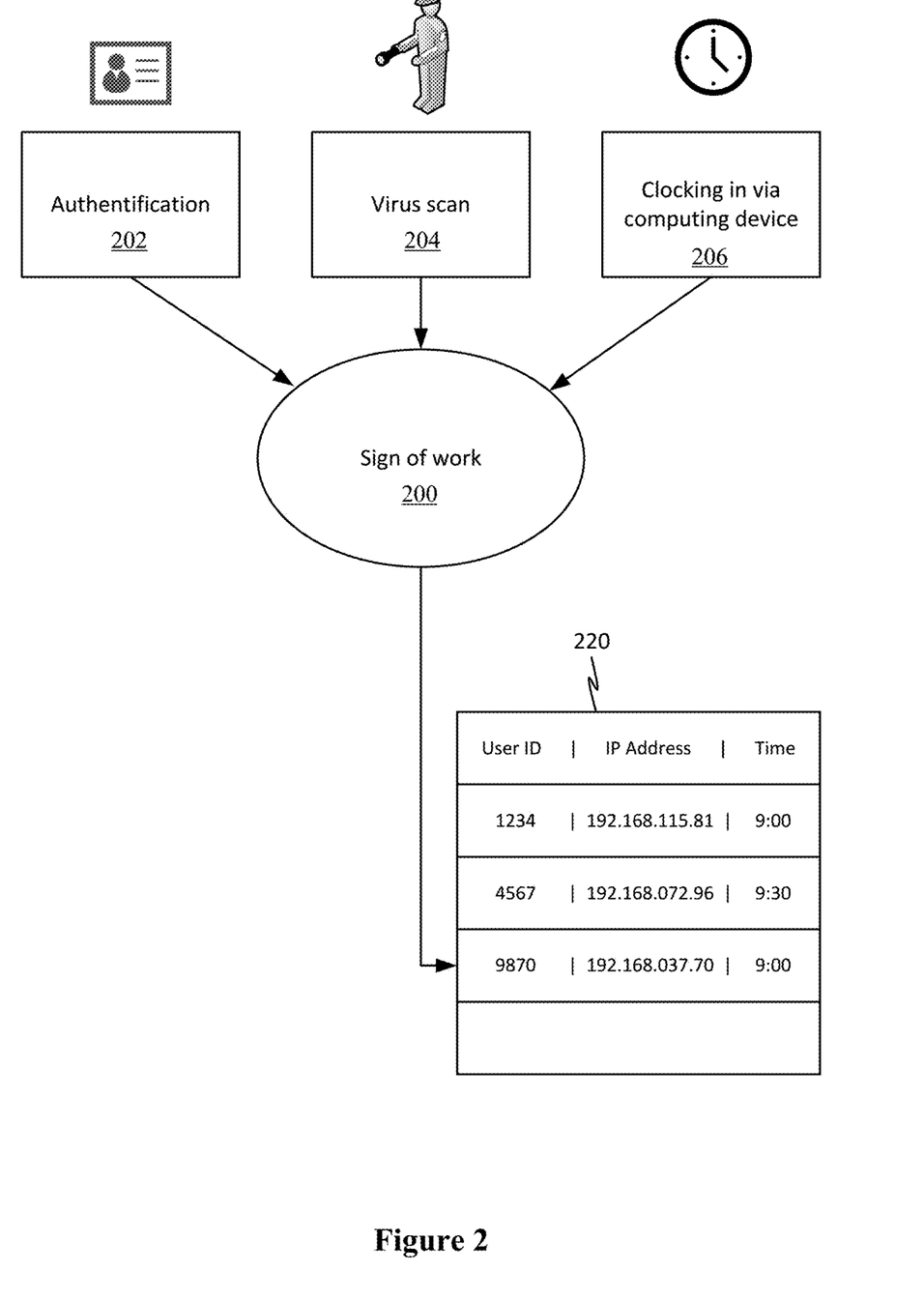
FIG. 2 provides an illustrative representation of certain signs of work in the network and security data.

Turning to FIG. 1A, during time period A, five users logged on to the enterprise network 140. This activity (of logging on to the enterprise network) is an example activity that can result in network and security data that includes, for example, date, time, IP address, and a user identifier. That is, network and security data is generated (and stored in logs for example by firewalls, IP address management, and endpoint security tools) as computing devices access and communicate over the enterprise network 140. Certain activities, including the above described 'logging on' to the network, captured in the network and security data can be considered a sign of work. FIG. 2 provides an illustrative representation of certain signs of work in the network and security data.

Referring to FIG. 2, there are a variety of signs of work 200 generated in network and security data that could be purposed by the system to identify a unique user as being in a particular location. For example, a user could access a resource requiring some form of authentication 202—for example, upon logging in to a computer, server, or program—and be required to submit authentication information such as user name and password (e.g., submission of authentication from a user). Activation of a virus scan 204 or other security feature or application (e.g., from an endpoint security tool) can result in a sign of work 200 that includes a user identifier and IP address. As another example, a user could clock in via an application on their computing device and a clocking in signal 206 may include a user identifier and an IP address and therefore be able to be used as a sign of work in the network and security data. The network and security data can be stored in a storage resource 220 that includes structured data that at least identifies an IP address with an associated user identifier. For certain types of network and security data, a date/time value can be stored associated with a logged activity.

Returning to FIG. 1A, from the network and security data, the system 150 can identify that four employees were at the First Office 110 and one employee was at the Second Office 120, reflected in the representative plot in FIG. 1A.

Turning to FIG. 1B, during time period B, seven users logged on to the enterprise network 140. From this data, the system 150 can identify that one employee was working from home 130, four employees were at the First Office 110, and two employees were at the Second Office 120, reflected in the representative plot in FIG. 1B.

Turning to FIG. 1C, during time period C, four users logged on to the enterprise network 140. From this data, the system 150 can identify that three employees were at the First Office 110 and one visitor was at the First Office 110, reflected in the representative plot in FIG. 1C. In some cases, visitors may be determined by the system 150 based on a predefined visitor IP address (e.g., because of guest access to the network 140). In some cases, visitors may be determined by the system 150 based on prior activity of the user (e.g., with respect to location that the user is typically found).

Over time, information about the real estate usage can be captured and insights gleaned from the information. To accomplish this physical real estate utilization determination, the system 150 performs a method such as described with respect to FIG. 3.

Figure 3:
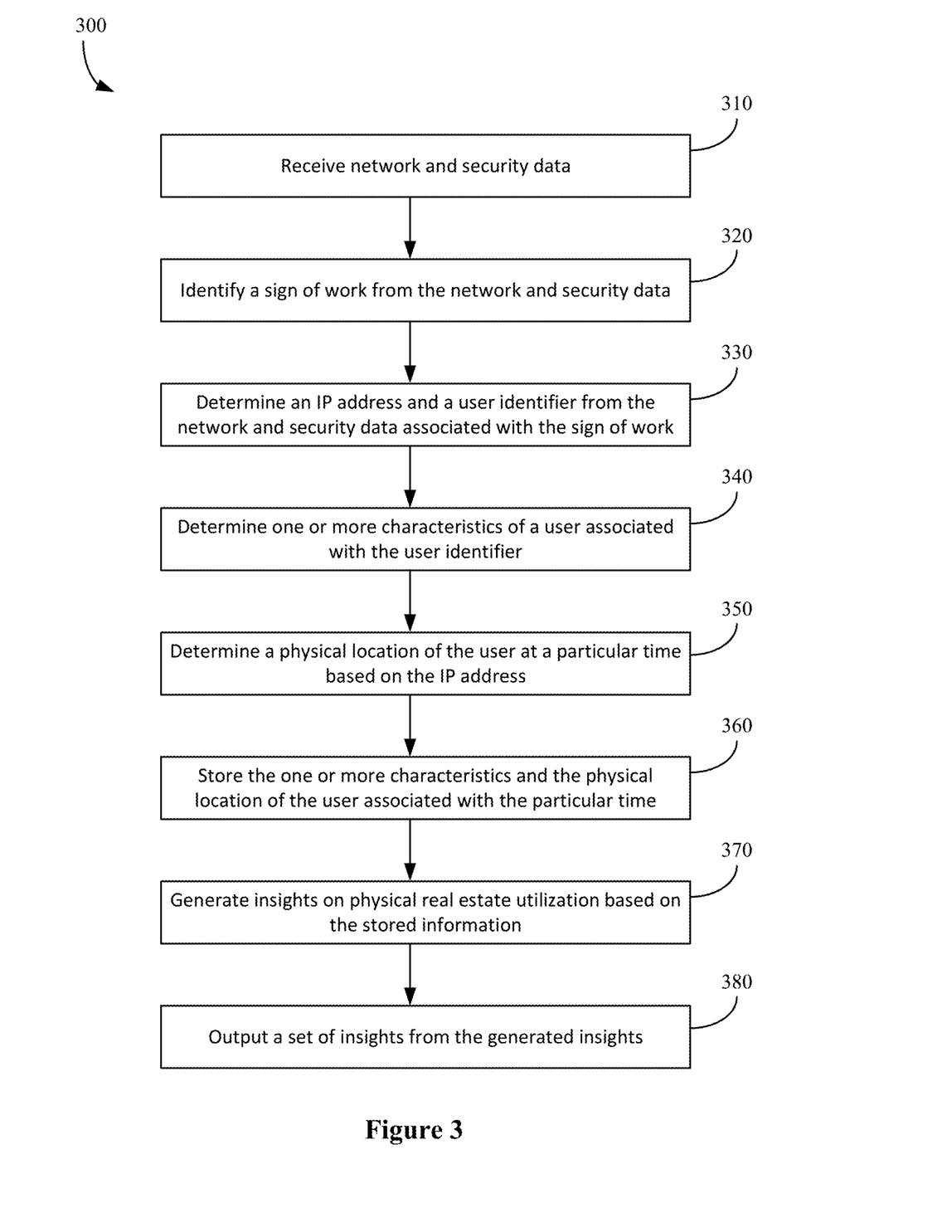
FIG. 3 illustrates a process flow for determining physical real estate utilization from network and security data.

FIG. 3 illustrates a process flow for determining physical real estate utilization from network and security data. The process 300 can begin by receiving network and security data (310) of an enterprise. An enterprise is an organization or business that manages a plurality of employees and operates private resources (e.g., software, data, hardware) with which employees interact via connected computers and devices. The network and security data refers to data that includes at least an IP address and a user identifier (e.g., due to authentication requirements for permissions to access the network). The network and security data can further include temporal data, such as date, time, and length of access. It is possible that not all of the received network or security data is pertinent to determining real estate utilization. In an example implementation, the network and security data can be stored in an endpoint security software data resource such as available by VMWare (e.g., Carbon Black), CrowdStrike, Microsoft, and Cisco.

From the received network and security data, signs of work can be identified (320). As described with respect to FIG. 2, there are a number of different activities reflected in the network and security data that can indicate a sign of work. The system can identify the signs of work in the network and security data by, for example, searching for specific types of logs or activity name, performing pattern matching, or performing classification processes as some examples. In some cases, each event logged in a particular network and security data resource is considered a sign of work. In some cases, specific types of events are considered a sign of work (e.g., resulting in not all of the data indicating a sign of work).

For each sign of work identified in operation 320, the system determines (330) an IP address and a user identifier from the network and security data associated with the sign of work. The user identifier is used to determine (340) one or more characteristics of a user associated with the user identifier. The one or more characteristics of the user associated with the user identifier can be determined by searching a storage resource containing user management or identity-related information (e.g., Microsoft Active Directory, Apache Directory). User characteristics of a user can include primary work location, department, and employment status. When there is no matching user identifier in the storage resource, the user can be flagged as an unknown user.

The IP address is used to determine (350) the location of the user at a particular time. Determining the physical location of the user based on the IP address can include determining whether the user is on a virtual private network (VPN) or physically present. The subnet range of the IP address can indicate whether the IP address belongs to a set of addresses associated with VPN access. If it is determined that the IP address is associated with the VPN, a remote indicator can be assigned to the user for that particular time. If the user is physically present, a physical location of the user can be determined by searching a resource associated with IP address management (which may be a same resource or different resource than that storing the user characteristics information). The IP address subnet range can indicate that the IP address belongs to a set of IP addresses associated with a particular location. In some cases, a lookup process can be performed to identify a corresponding physical location having a set of IP addresses associated therewith to which the IP address belongs. A lookup process retrieves information from a storage resource and is commonly used for searching tabular data structures and key-value fields.

In some cases, a user can be identified as a visitor to a particular location using information of the physical location determined from the IP address and information of a known main office that may be available as one of the one or more user characteristics determined from the user identifier. When such a user is identified, a visitor indicator may be assigned to the user for that particular time. In some cases, identifying a user as a visitor may require historical information and can be considered part of a step that involves applying filters to the determined information.

Once the user characteristics of the user and the physical location of the user associated with the particular time are determined, this information can be stored (360), for example, in a storage resource used. In some cases, one or more filters can be applied to remove information from the storage resource and/or avoid storing such information during operation 360. Example filters include removing physical location information associated with unknown users and removing physical location information and associated one or more user characteristics associated with VPN users. For removing the unknown users, if user characteristics cannot be determined for a particular user identifier, that user can be flagged as an unknown user.

From the stored information obtained from the signs of work, the system can generate (370) insights on physical real estate utilization based on at least two features selected from the following three features: the one or more user characteristics of each user, the physical location of each user, and temporal data from the received network and security data of the enterprise. Insights can be identified using any suitable data analytics approach, for example, involving statistical analysis and data presentation. For example, a graph of activity of two or more users can be compared across time. A non-exhaustive list of insights can include: the maximum number of distinct employees in a given time at a particular location; the average number of distinct employees in a given time at a particular location; the average number of distinct visiting employees in a given time at a particular location; and a breakdown of employees by department in a given time at a particular location. As mentioned above, in some cases, a subset of the users can be removed from the storage or not considered when generating the insights. For example, unknown users, visitors, and remote users can all potentially be removed either automatically or as a result of an input or request. Removal of users can include removal of one or more of IP address information, physical location information, user identifier information, and user characteristic information.

In some cases, insights on physical real estate utilization are automatically generated and updated after receiving after receiving network and security data associated with a new user. In other cases, user characteristics of the user and the physical location of the user are simply stored until a specific user input requests for insights to be generated. The specific user input request can include, for example, specific insights to be generated. A set of insights from the generated insights can be output (380). The output can be, for example, displayed at a user interface. Examples of visualizations of the output of a set of insights are shown in FIGS. 4A-4E.

FIGS. 4A-4E show example plots for insights on physical real estate utilization. The insights generated by the processes described with respect to FIG. 3 enables an understanding of not just the number of employees in a given building, but also how the employees are using the space and the information can be visualized in a user interface of an application (e.g., web browser or local application) that accesses the generated insights that is displayed at a user's computing device. Tools can be provided with the user interface to select a variety of different combinations of features or features at different levels of resolution (as well as select to include VPN users or not). For example, time and location data can be compared, but the time scale can be on the order of days or hours. Similarly, location data can be at the level of continent, country, state, city, singular address, or suite within a particular singular address.

Figure 4A:
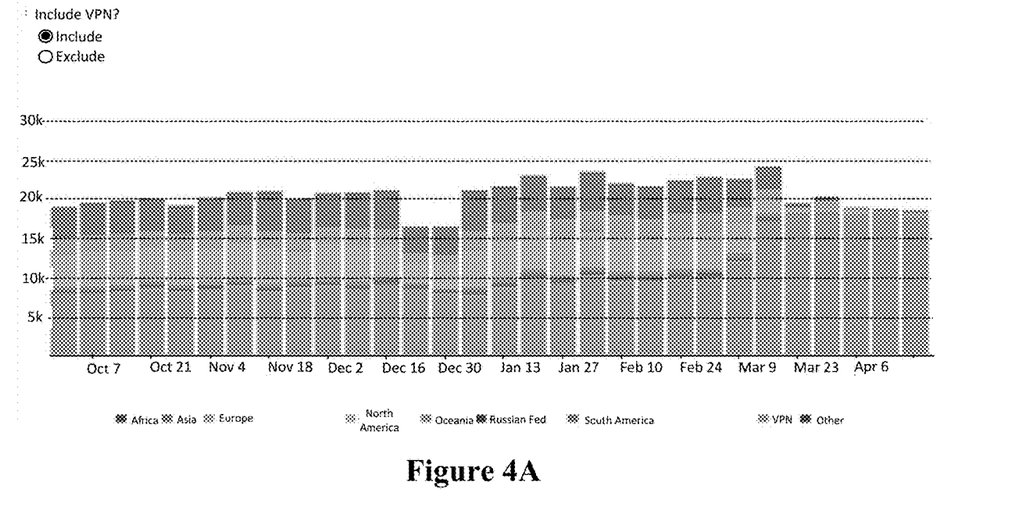
FIGS. 4A-4E show example plots for insights on physical real estate utilization.

Turning to FIG. 4A, a representation is shown of a total number of employees by region. The illustrated bar graph shows a maximum number of people per day in a given week. The bar is further broken down by region (listed here as continent or country). VPN usage is also included in the bar graph, which enables an insight with respect to employee behavior—in this case with respect to working from home vs going to the office. In FIG. 4A, a rise in VPN usage and a sharp decline of in-person office visits can be seen as a global behavior and not just in one region.

Figure 4B:
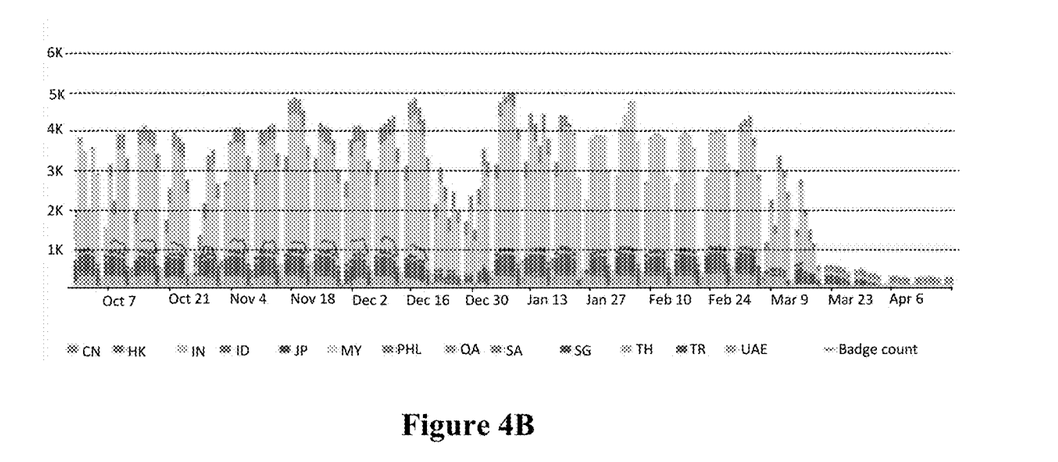

Turning to FIG. 4B, a representation is shown that breaks down a subset of the output. Here, more information is provided for one of the regions. For example, selecting 'Asia' in the representation shown in FIG. 4A results in a representation showing only users located in Asia broken down into a daily distinct number of employees that were physically present in an office by country in Asia. In FIG. 4B, it can be seen that there are periods of time where one country in the region was not in the office, but others are (see e.g., December for UAE and February for China).

Figure 4C:
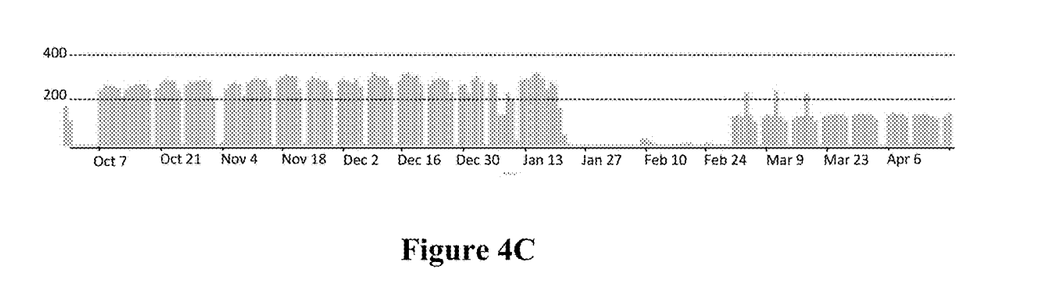

Turning to FIG. 4C, a representation is shown that further breaks down a subset of the output. Here, more information is provided for one of the countries. For example, selecting 'China' in the representation shown in FIG. 4B results in a representation showing only users in the China offices broken down into a daily distinct number of employees that were physically present in an office by city in China. A variety of factors can be important for determining optimal real estate usage at a broad level. For example, average number of employees and maximum number of employees can be used to determine whether there is a mismatch between usage and size at a particular office. In FIG. 4C, aside from an almost entire drop-off of attendance between mid-January and late February, attendance after the drop-off can be seen to be about half of before the drop-off. This can potentially indicate that there is some real estate that is not being utilized optimally or confirm whether employees are following a particular methodology regarding being physically in the office.

Figure 4D:
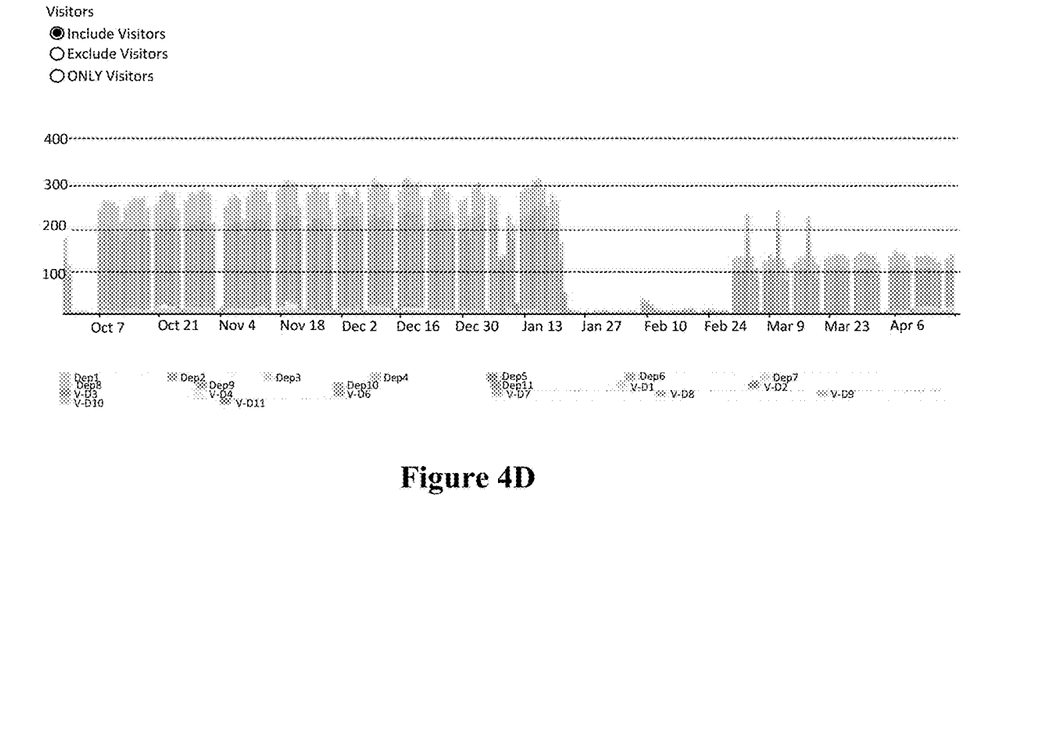

Turning to FIG. 4D, further granularity and information of features can be shown. At any level of resolution, it is possible to add additional features to a representation, including employment status and department. For example, a particular office can be selected to view (e.g., the Shanghai Office) and then a breakdown of employees by department is shown. This breakdown of employees by department can be used, for example, to determine whether certain employees could be more optimally moved to another office, perhaps to more easily interact with other employees of a same department. Real estate finances can thus be allocated to particular departments based on actual real estate utilization. In FIG. 4D, it can be seen that operations and technology is the largest department working in the office. It should be noted that since the one or more characteristics determined for a user identifier can include further granularity (e.g., an individual's line manager), it is possible to provide insights with further granularity; however, department level is most beneficial with respect to real estate finances in most cases.

The historical data showing where an individual is usually working can be used to determine where an individual typically works and that user can have that location labeled as their "main office." Any time that individual is not in their main office, that user can be classified as a visitor. Thus, the user interface can also support viewing only those labeled as a visitor to a particular office.

Figure 4E:
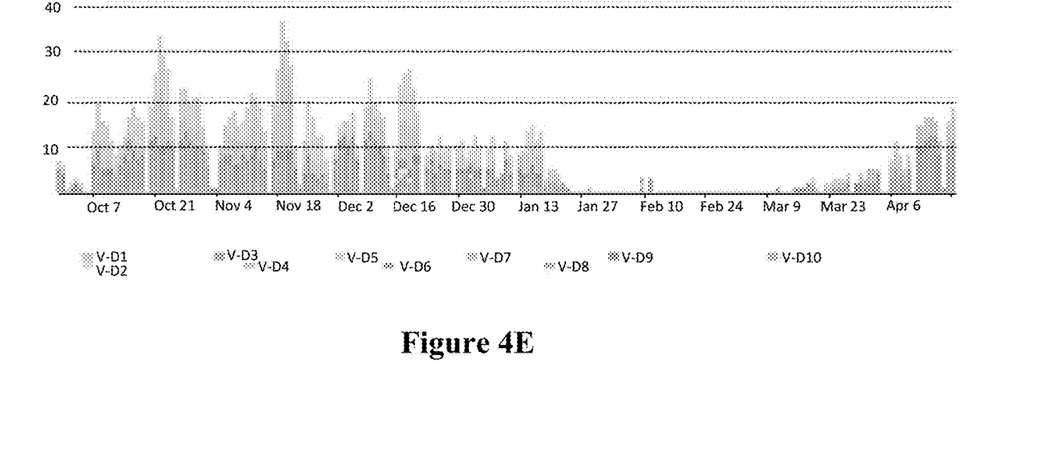

Turning to FIG. 4E, a breakdown of employees by visiting status can also be provided. The breakdown of employees by visiting status can be useful, for example, to determine usage of real estate. In some cases, visitor employees or temporary employees may require different levels of permanent offices (e.g., shared or hotel-style office space), so determining frequency and numbers of visiting employees can be advantageous. Additionally, in some cases offices may be used for physically meeting with employees at other offices—if visiting employees are frequent but not consistent, optimal real estate usage may include larger or more numerous conference areas. In FIG. 4E, by choosing "only visitors", the graph displays a count of people that were labeled as "visitor". Real estate teams can determine if there is sufficient shared or hotel style workspaces to accommodate visitors to the office. In addition, by knowing what department that the individuals are visiting from, it is possible to determine the types of resources that the office should provide.

In addition to graphical representations, a tabular report can be provided, for example giving the median and maximum number of individuals per office in a given city. Such information can be compared with other real estate data (e.g., square footage of a building) to determine occupancy rate and real estate utilization.

FIG. 5 shows a system for performing determination of physical real estate utilization. For example, a computing device embodied as system 500 can be used to execute assessment of network and security data to determine physical real estate utilization, including the processes described with respect to FIG. 3. It should be understood that aspects of the system described herein are applicable to both mobile and traditional desktop computers, as well as server computers and other computer systems. Further, components of system 500 may be distributed across multiple areas, hosted externally, or hosted at an office System 500 includes a processor 505 (e.g., CPU, GPU, FPGA) that processes data according to instructions of various software programs, including software instructions 510 for performing assessment of network and security data to determine physical real estate utilization as described herein, stored in memory 515.

Memory 515 can be one or more of any suitable computer-readable storage medium including, but not limited to, volatile memory such as random-access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the memory 515 consist of transitory propagating signals.

As mentioned above, memory 515 can store instructions 510 for assessment of network and security data to determine physical real estate utilization as described herein. Instructions 510 may include instructions for process 300 described with respect to FIG. 3 that direct the system to perform determination of physical real estate utilization. System 500 can also include structured data storage resources, for example, a storage resource 520 of IP-address-to-location data, a storage resource 525 of user identifiers paired with user characteristics, and a storage resource 530 of the determined data used to generate insights.

System 500 includes a network interface 540. The network interface 540 facilitates communication between system 500 and the "outside world," via a communications carrier or service provider. The network interface 540 allows system 500 to communicate with other computing devices, including server computing devices and other client devices, over a network.

In various implementations, data/information used by and/or stored (in resources 520, 525, 530) via the system 500 may include local data caches or storage media that may be accessed via the network interface 540

System 500 can also include user interface system 550, which may include input and output devices and/or interfaces such as for audio, video/display, touch, mouse, and keyboard.

Accordingly, embodiments of the subject invention may be implemented as a computer process, a computing system, or as an article of manufacture, such as a computer program product or computer-readable storage medium. Certain embodiments of the invention contemplate the use of a machine in the form of a computer system within which a set of instructions, when executed, can cause the system to perform any one or more of the methodologies discussed above, including process 300. The set of instructions for the software tool can be stored on a computer program product, which may be one or more computer readable storage media readable by a computer system and encoding a computer program including the set of instructions and other data associated with the software tool.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random-access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" or "storage" consist of transitory propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of determining physical real estate utilization comprising:
   receiving network and security data of an enterprise;
   identifying a sign of work from the network and security data;
   for each identified sign of work:
      determining an Internet Protocol (IP) address and user identifier from the network and security data associated with the sign of work;
      determining one or more user characteristics of a user associated with the user identifier, wherein the one or more user characteristics of the user comprises one or more of: primary work location of the user, department of the user, and employment status of the user;
      determining a physical location of the user at a particular time based on the IP address; and
      storing the one or more user characteristics of the user and the physical location of the user associated with the particular time;
   for each identified sign of work, if user characteristics cannot be determined for a particular user identifier, flagging the user as an unknown user;
   removing physical location information associated with unknown users;
   after removing the physical location information associated with unknown users, generating one or more insights on physical real estate utilization, including occupancy of one or more particular physical locations, based on at least two features from the group consisting of: the one or more user characteristics of each user of a plurality of users determined from identified signs of work from the network and security data, the physical location of each user of the plurality of users determined from identified signs of work from the network and security data, and temporal data from the received network and security data of the enterprise; and
   outputting a set of insights from the generated insights.

2. The method of claim 1, wherein for the each identified sign of work, determining the physical location of the user at the particular time based on the IP address comprises:
   determining whether the IP address is associated with a Virtual Private Network (VPN);
      when it is determined that the IP address is associated with the VPN, assign a remote indicator; and
      when it is determined that the IP address is not associated with the VPN, performing a lookup process to identify a corresponding physical location having a set of IP addresses associated therewith to which the IP address belongs; and before generating insights on physical real estate utilization, removing physical location information and associated one or more user characteristics associated with VPN users.

3. The method of claim 1, further comprising:

determining whether the user is a visitor to a particular location by comparing the physical location of the user of the network and security data with a known main office of the user indicated by the one or more user characteristics.

4. The method of claim 1, wherein one of the one or more insights comprises a maximum number of distinct employees in a given time at a particular location.

5. The method of claim 1, wherein one of the one or more insights comprises an average number of distinct employees in a given time at a particular location.

6. The method of claim 1, wherein one of the one or more insights comprises an average number of distinct visiting employees in a given time at a particular location.

7. The method of claim 1, wherein one of the one or more insights comprises a breakdown of employees by department in a given time at a particular location.

8. The method of claim 1, wherein the sign of work comprises submission of authentication from a user.

9. The method of claim 1, wherein the sign of work comprises a signal indicating activation of a virus scan.

10. The method of claim 1, wherein the sign of work comprises a signal from an application that a user has clocked in.

11. A system for determining physical real estate utilization comprising:

a processor;

one or more storage resources; and a memory storing instructions that when executed by the processor, direct the system to:

receive network and security data of an enterprise;

identify a sign of work from the network and security data;

for each identified sign of work:

determine an Internet Protocol (IP) address and user identifier from the network and security data associated with the sign of work;

determine one or more user characteristics of a user associated with the user identifier, wherein the one or more user characteristics of the user comprises one or more of: primary work location of the user, department of the user, and employment status of the user;

determine a physical location of the user at a particular time based on the IP address; and store in one of the one or more storage resources the one or more user characteristics of the user and the physical location of the user;

for each identified sign of work, if user characteristics cannot be determined for a particular user identifier, flag the user as an unknown user;

remove physical location information associated with unknown users;

after removing the physical location information associated with unknown users, generate insights on physical real estate utilization, including occupancy of one or more particular physical locations, based on at least two features from the group consisting of: the one or more user characteristics of each user of a plurality of users determined from identified signs of work from the network and security data, the physical location of each user of the plurality of users determined from identified signs of work from the network and security data, and temporal data from the received network and security data of the enterprise; and output a set of insights from the generated insights.

12. The system of claim 11, wherein the one or more storage resources comprises a user characteristics storage resource and wherein the instructions that direct the system to determine one or more user characteristics of a user associated with the user identifier comprise:

performing a lookup operation of the one or more user characteristics in the user characteristics storage resource using the user identifier.

13. The system of claim 11, wherein the one or more storage resources comprises an IP-address-location storage resource and wherein the instructions that direct the system to determine a physical location of the user at a particular time based on the IP address comprise:

performing a lookup operation of the physical location in the IP-address-location storage resource using the IP address.

14. A computer-readable storage medium having instructions stored thereon that when executed by a computing system perform a method comprising:

receiving network and security data of an enterprise;

identifying a sign of work from the network and security data;

for each identified sign of work:

determining an Internet Protocol (IP) address and user identifier from the network and security data associated with the sign of work;

determining one or more user characteristics of a user associated with the user identifier, wherein the one or more user characteristics of the user comprises one or more of: primary work location of the user, department of the user, and employment status of the user;

determining a physical location of the user at a particular time based on the IP address; and storing the one or more user characteristics of the user and the physical location of the user associated with the particular time;

for each identified sign of work, if user characteristics cannot be determined for a particular user identifier, flagging the user as an unknown user;

removing physical location information associated with unknown users;

after removing the physical location information associated with unknown users, generating insights on physical real estate utilization, including occupancy of one or more particular physical locations, based on at least two features from the group consisting of: the one or more user characteristics of each user of a plurality of users determined from identified signs of work from the network and security data, the physical location of each user of the plurality of users determined from identified signs of work from the network and security data, and temporal data from the received network and security data of the enterprise; and outputting a set of insights from the generated insights.

15. The computer-readable storage medium of claim 14, wherein the sign of work comprises submission of authentication from a user.

16. The computer-readable storage medium of claim 14, wherein the sign of work comprises a signal indicating activation of a virus scan.

17. The computer-readable storage medium of claim 14, wherein the sign of work comprises a signal from an application that a user has clocked in.

\* \* \* \* \*